(12) United States Patent
Stevenson et al.

(10) Patent No.: US 7,451,679 B2
(45) Date of Patent: Nov. 18, 2008

(54) APPARATUS FOR INITIATING AND DISPENSING AN INCENDIARY

(75) Inventors: Robert Stevenson, Maylands (AU); Peter Hanbury, Armadale (AU)

(73) Assignee: Raindance Systems Pty Ltd., Jandakot, Western Australia ( * ) Notice: Subject to any disclaimer, the term of this patent is extended or adjusted under 35 U.S.C. 154(b) by 539 days.

(21) Appl. No.: 10/534,123

(22) PCT Filed: Nov. 7, 2003

(86) PCT No.: PCT/AU03/01477

§ 371 (c)(1),
(2), (4) Date: May 6, 2005

(87) PCT Pub. No.: WO2004/041365

PCT Pub. Date: May 21, 2004

(65) Prior Publication Data

US 2006/0027380 A1 Feb. 9, 2006

(30) Foreign Application Priority Data

Nov. 7, 2002 (AU) .............................. 2002952523

(51) Int. Cl.
*B64D 1/04* (2006.01)
*F41F 5/00* (2006.01)

(52) U.S. Cl. ............................ 89/1.51; 89/1.52; 89/1.1; 102/364; 102/336

(58) Field of Classification Search ................. 89/1.51, 89/1.52, 1.1; 102/364, 365, 335, 346, 336; 169/53, 36, 45, 46, 52, 54, 70
See application file for complete search history.

(56) References Cited

U.S. PATENT DOCUMENTS

| 1,332,022 A | * | 2/1920 | Becker ........................ 89/1.51 |
| 1,632,414 A | * | 6/1927 | Nosan ......................... 89/1.51 |
| 1,721,883 A | * | 7/1929 | Marsh et al. ................. 89/1.51 |
| 2,278,949 A | * | 4/1942 | Sabini .......................... 222/3 |

(Continued)

FOREIGN PATENT DOCUMENTS

GB 245244 1/1926

OTHER PUBLICATIONS

Premo MK III Aerial Ignition System, Operations Handbook, SN 0308-394AF, Year of Manufacture: 2004.*

(Continued)

*Primary Examiner*—Michelle Clement
(74) *Attorney, Agent, or Firm*—Neifeld IP Law, PC

(57) ABSTRACT

An apparatus (10) for initiating and dispensing an incendiary comprises a feed mechanism (12) for advancing a line of series connected incendiaries to a dispensing location D; an injection device (14); and a cutter (16). The injection device (14) injects a substance such as glycol into the incendiary as it is moved toward, but prior to reaching, the dispensing location D. The glycol reacts exothermically with another substance such as potassium permanganate in the incendiary. The cutter (16) cuts the incendiary into which the glycol has been injected from the line of series connected incendiary. After the incendiary has been injected with the glycol and cut by the cutter (16) from the line, the feed mechanism (12) advances the incendiary to the dispensing location D where it is dispensed by the action of gravity from the apparatus (10).

25 Claims, 9 Drawing Sheets

U.S. PATENT DOCUMENTS

| | | | | |
|---|---|---|---|---|
| 2,347,163 A * | 4/1944 | Kraft et al. | ..................... | 89/1.51 |
| 2,442,381 A * | 6/1948 | Short | ........................... | 89/1.51 |
| 2,646,786 A * | 7/1953 | Robertson | ..................... | 124/26 |
| 3,448,654 A * | 6/1969 | Crabtree et al. | .............. | 89/1.51 |
| 3,519,221 A * | 7/1970 | Kifor | ........................... | 342/12 |
| 3,780,655 A * | 12/1973 | Allen et al. | .................. | 102/335 |
| 3,951,066 A * | 4/1976 | Schroeder | .................... | 102/364 |
| 3,951,068 A * | 4/1976 | Schroeder | .................... | 102/364 |
| 3,979,850 A | 9/1976 | Schiessl et al. | | |
| 4,015,355 A | 4/1977 | Schiessl et al. | | |
| 4,141,274 A * | 2/1979 | Gerber | ........................ | 89/1.51 |
| 4,696,347 A * | 9/1987 | Stolov et al. | ................... | 169/46 |
| 5,168,123 A * | 12/1992 | Lee | ............................. | 102/363 |
| 5,267,501 A * | 12/1993 | Shillig | ......................... | 89/1.51 |
| 5,783,768 A * | 7/1998 | Jacobson | ..................... | 102/334 |
| 5,997,667 A * | 12/1999 | Jacobson | ...................... | 149/37 |
| 6,877,433 B1 * | 4/2005 | Stevenson | .................... | 102/364 |
| 7,083,000 B2 * | 8/2006 | Edwards et al. | ................ | 169/47 |
| 7,210,537 B1 * | 5/2007 | McNeil | ........................ | 169/46 |
| 7,275,529 B2 * | 10/2007 | Boys | ............................ | 124/66 |
| 2003/0006319 A1 * | 1/2003 | Silverstein et al. | ........... | 239/672 |
| 2007/0007021 A1 * | 1/2007 | Regan | ........................... | 169/84 |

OTHER PUBLICATIONS

RD 436051 A (ANONYMOUS) abstract, Aug. 10, 2000.
International Search Report PCT/AU2003/001477, Feb. 9, 2004.

\* cited by examiner

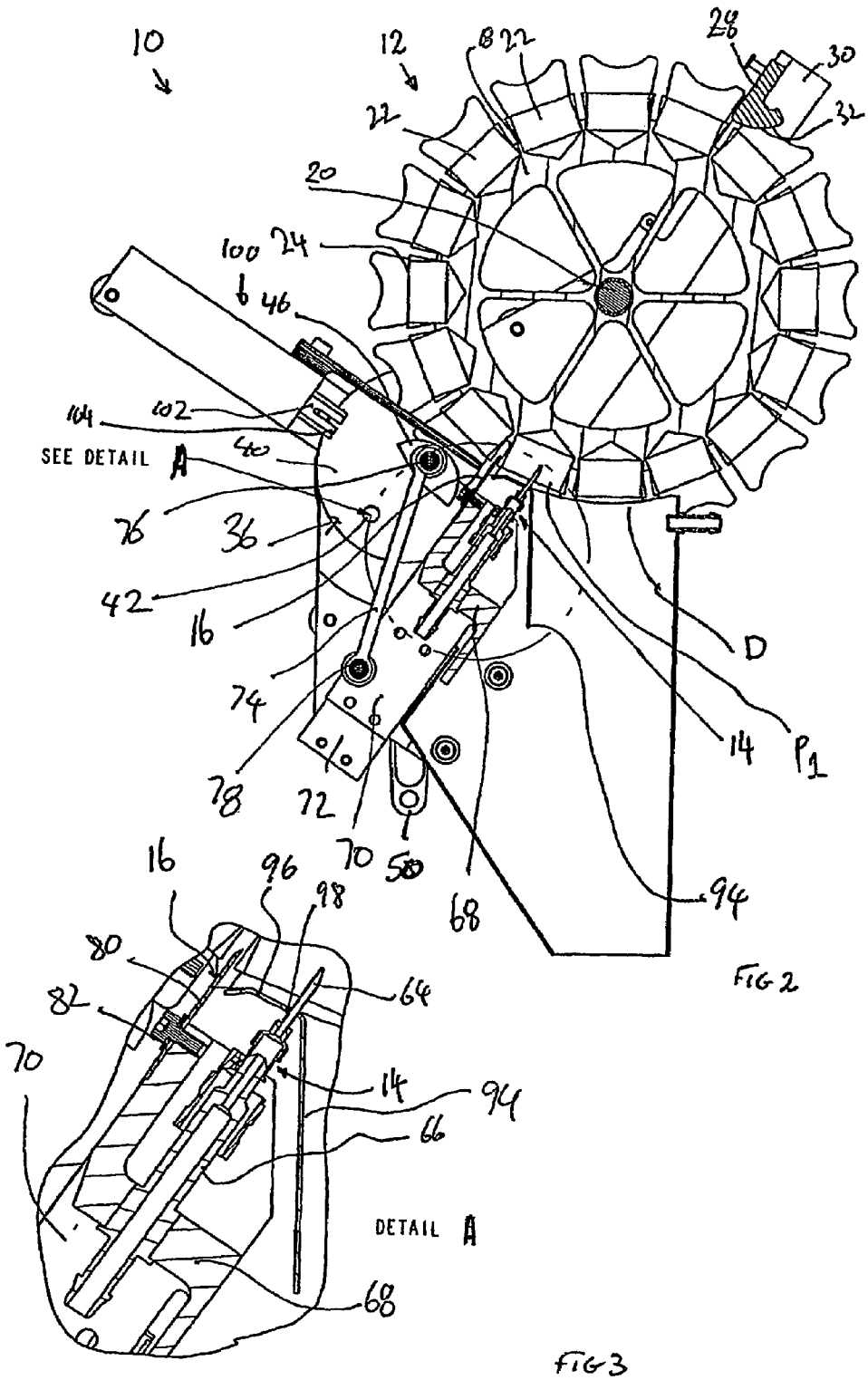

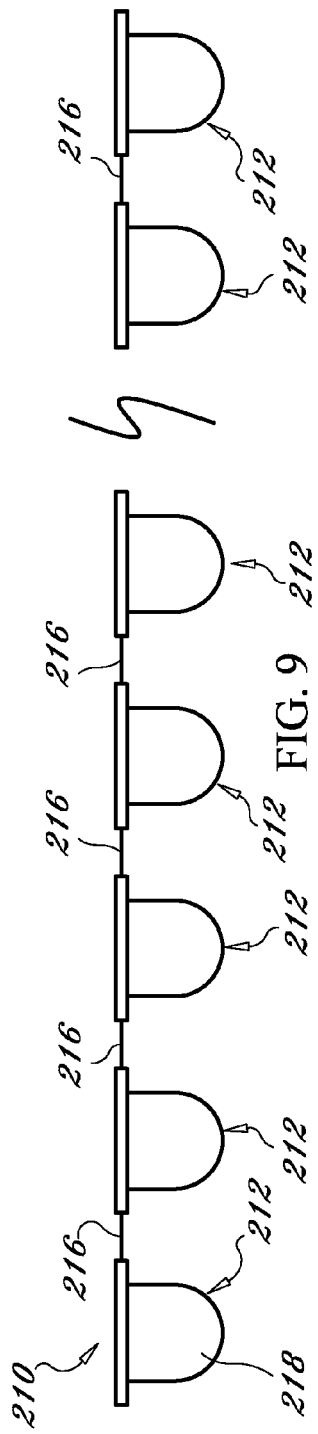
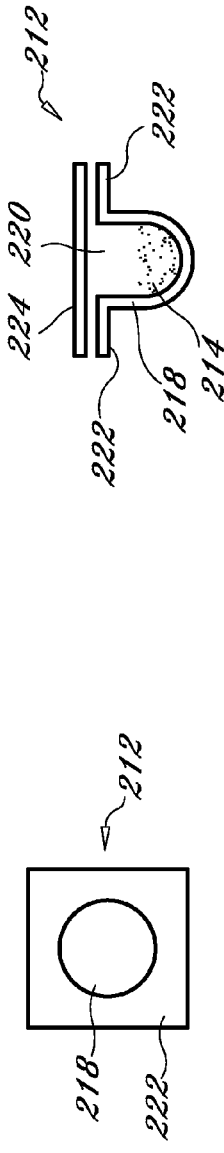
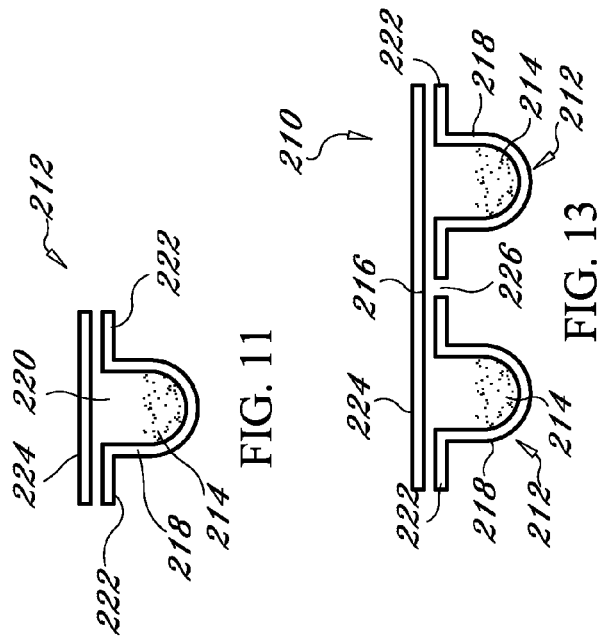
FIG. 9
FIG. 10
FIG. 11
FIG. 12
FIG. 13

APPARATUS FOR INITIATING AND DISPENSING AN INCENDIARY

FIELD OF THE INVENTION

The present invention relates to an apparatus for initiating and dispensing an incendiary, and in particular, but not exclusively, for use in airborne fire control procedures such a backburning.

BACKGROUND OF THE INVENTION

It is known to drop incendiaries from helicopters and light aircraft for the purposes of forestry management and back burning. One known incendiary is in the form of a small sphere (of approximately 32 mm diameter) of plastics material filled with a quantity of potassium permanganate granules or powder. Each sphere is formed from two hemispheres injection moulded from extruded plastic and subsequently joined together. A small hole is formed in the sphere to allow filling with a volume of potassium permanganate. The hole is then sealed with wax (hot glue). These spheres are usually dropped from a semi-automatic dispenser provided with a hopper for holding a large number of spheres and which feeds the spheres sequentially to a chute where they are injected with a small volume of glycol. The potassium permanganate and glycol react exothermically leading to their mutual combustion.

This combination of incendiary and dispenser have low reliability. This is in part due to difficulties in sequentially feeding the spheres to a chute and then successfully injecting them with glycol. It is not uncommon for the spheres to become jammed in the chute which then requires manual clearing. If the clearing is not performed expeditiously, there is a risk of combustion occurring within the chute itself. Sometimes, to assist in feeding the spheres to the chute, an agitator is provided in the hopper. However the agitator can cause the spheres to simply circulate within the hopper without dropping into the chute. Another reason for the relatively low reliability is the sealing of the holes through which the spheres are initially loaded with potassium permanganate with wax or hot glue. If the spheres are orientated so that the needle injecting the glycol is aligned with the wax or glue, the needle can become blocked and has to be removed and cleaned before further use. Also, sometimes the needle hits the join and crushes the sphere.

SUMMARY OF THE INVENTION

According to the present invention there is provided an apparatus for initiating and dispensing an incendiary from a line of series connected incendiaries, said apparatus in comprising:

a feed mechanism for advancing a line of series connected incendiaries to a dispensing location;

an injection device for injecting a substance into an incendiary as said incendiary is advanced to said dispensing location, said injected substance reacting exothermically with another substance in said incendiary; and, a cutter for cutting said incendiary from said line of series connected incendiaries;

wherein said feed mechanism advances said incendiary, after injection with said substance and cutting from said line, to said dispensing location where said incendiary is dispensed from said apparatus.

Preferably said feed mechanism comprises at least one recess, each recess shaped to seat a respective incendiary.

Preferably said feed mechanism comprises a plurality of recesses, each recess shaped to seat a respective incendiary, and wherein adjacent recesses are spaced by a distance substantially equal to the distance between adjacent series connected incendiaries.

Preferably said apparatus further comprises a drive system for driving said feed mechanism.

Preferably said drive system is coupled to said injection device for moving said injection device between an extended position where said injection device penetrates said incendiary, and a retracted position where said injection device is spaced from said incendiary.

Preferably said drive system is coupled to said cutter for moving said cutter between an extended position where said cutter cuts an incendiary from said line and a retracted position where said cutter is spaced from said line.

Preferably said injection device and cutter are marked on a slide and said slide is reciprocated by said drive system between said extended position and said retracted position.

Preferably said slide is supported on a rail and said drive system reciprocates said slide along said rail.

Preferably said drive system is coupled to said injection device and said cutter to simultaneously move said injection device and cutter between said respective extended positions, and said retracted positions.

Preferably said cutter is mounted on said slide. Preferably a slot is provided between respective adjacent recesses in said feed mechanism over which said line extends when being advanced to said dispensing position, and said cutter is juxtaposed to extend into said slot to cut said line when moved to its extended position.

Preferably said apparatus further comprises a retaining member for retaining an incendiary in a respective recess while said injection device and said cutter are moved from their respective extended positions to their respective retracted positions.

Preferably said injection device extends through said retaining member when said injection device is moved to said extended position.

Preferably said retaining member is a plate having a first portion which faces an incendiary when at a location where said injection device penetrates said incendiary.

Preferably said apparatus further comprises a pump for pumping a dose of said substance to an incendiary via said injection device.

Preferably said pump is driven by said drive system.

Preferably said pump is a peristaltic pump.

Preferably said drive system comprises an intermittent gear arrangement including a driver arranged for continuous rotation and a follower supporting said feed mechanism wherein for a first portion of a revolution of said driver, said driver engages said follower to rotate said follower by a fraction of a revolution, and for a remaining portion of the revolution of said driver, said follower is locked against rotation. Preferably said intermittent gear arrangement is a geneva gear.

Preferably said driver is coupled to said slide for reciprocating said slide along said rail.

Preferably said apparatus further comprises a link pivotally coupled at one end to said driver and pivotally coupled at an opposite end to said slide.

Preferably said apparatus further comprises a park system for biasing said injection device to said retracted position.

Preferably said park system biases said driver to rotate to a position where said driver drives said slide along said rail to a location commensurate with said injection device being in said retracted position.

Preferably said apparatus further comprises a housing in which said feed mechanism, cutter and injection device are housed, said housing having an inlet through which said line of series connected incendiaries can enter said housing and a chute through which incendiaries are dispensed.

Preferably said apparatus further comprises an extinguishing system for extinguishing an incendiary into which said substance is injected.

In an alternate embodiment, a processor or computer may be used to control the motion of the feed mechanism and injection device.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

BRIEF DESCRIPTION OF THE DRAWINGS

An embodiment of the present invention will now be described by way of example only with reference to the accompanying drawings in which:

FIG. 2 is a partial section view of the components shown in FIG. 1;

FIG. 3 is an enlarged view of detail A shown in FIG. 2;

FIG. 9 is a schematic representation from the side of an incendiary belt for use with the apparatus depicted in FIGS. 1-8;

FIG. 10 is a bottom view of one incendiary in the incendiary belt shown in FIG. 9;

FIG. 11 is a section view through the incendiary shown in FIGS. 9 and 10;

FIG. 12 is a schematic representation of the incendiary depicting one form of frangible coupling between adjacent containers;

FIG. 13 is a schematic representation of the incendiary depicting another form of frangible coupling between adjacent containers;

DESCRIPTION OF PREFERRED EMBODIMENT

Figure 1:
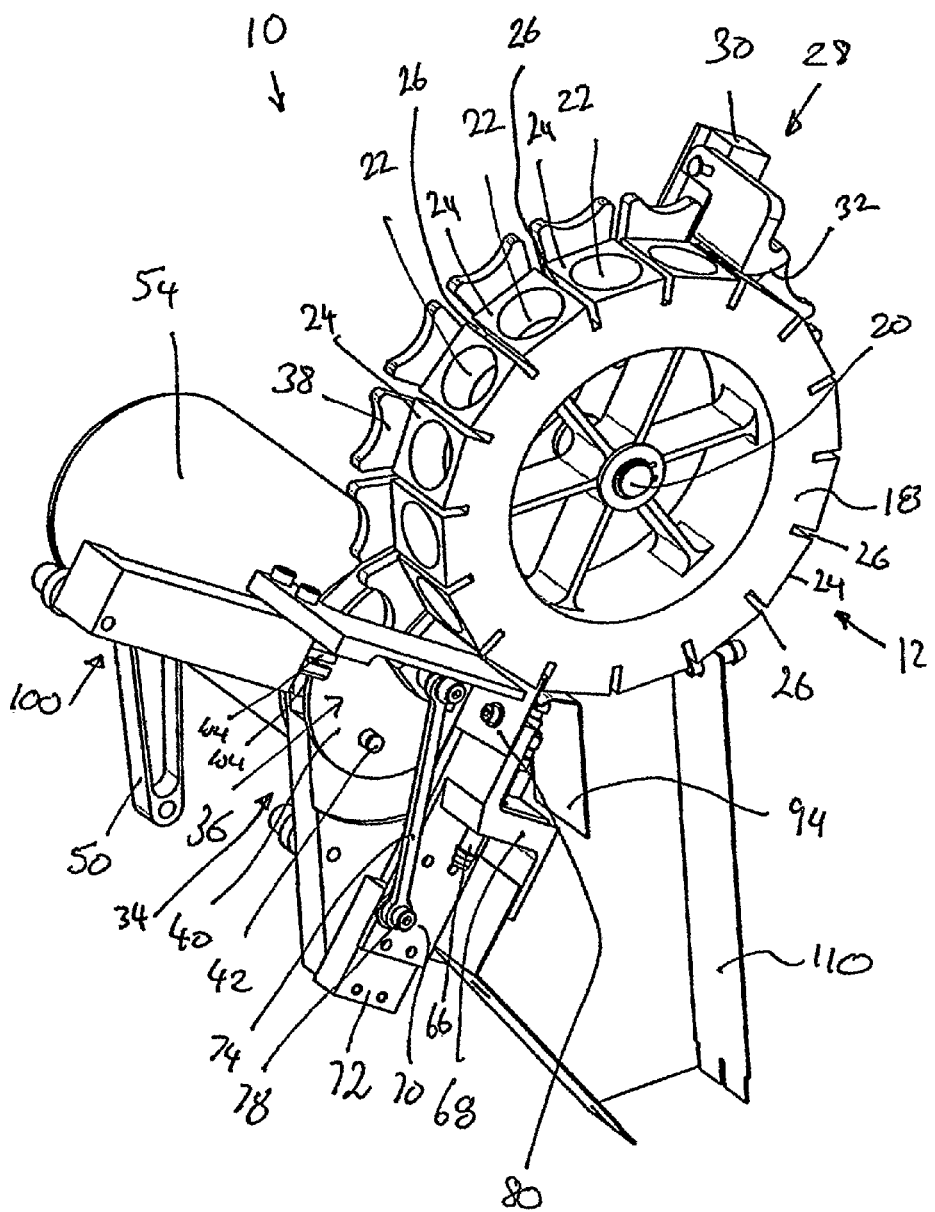
FIG. 1 is a perspective view of the main components of the apparatus for initiating and dispensing an incendiary.

Referring to the accompanying drawings, and in particular FIGS. 1-3, it is seen that an apparatus 10 for initiating and dispensing an incendiary capsule 212 (FIGS. 9-16) from a belt or line 210 of series connected incendiaries comprises a feed mechanism 12 for advancing the incendiary belt to a dispensing location D; an injection device 14; and a cutter 16. The feed mechanism 12 in this embodiment advances the line of incendiaries in an anti-clockwise direction to the location D which is at approximately the six o'clock position. The injection device 14 injects a substance such as glycol into an incendiary 212 as the incendiary belt 210 is moved toward, but prior to reaching, the dispensing location D. The glycol reacts exothermically with another substance such as potassium permanganate 214 in the incendiary 212. The cutter 16 cuts the incendiary 212 into which the glycol has been injected from the belt 210. After the incendiary 212 has been injected with the glycol and cut by the cutter 16 from the line, the feed mechanism 12 advances the incendiary 212 to the dispensing location D where it is dispensed from the apparatus 10.

The feed mechanism 12 comprises a wheel 18 which is rotatably mounted on an axle 20. The wheel 18 is provided with a plurality of recesses 22 formed in its outer circumferential surface 24. The recesses 22 are shaped to seat respective incendiaries 212. More particularly, the recesses 22 seat the incendiaries 212 with a degree of clearance so that when an incendiary cut from the line reaches the dispensing location D, it is able to fall freely from the corresponding recess 22 by action of gravity. Mutually adjacent recesses 22 are separated by slots 26 formed in the outer circumferential surface 24. Each slot 26 extends parallel to an axis of the wheel 18 and runs the full width of the wheel.

A spring-loaded guide 28 is supported on a member 30, which also supports the axle 20, above the outer circumferential surface 24 at approximately the one o'clock position. The guide 28 is biased toward the axle 20 and has a convexly curved surface 32 which converges toward the outer circumferential surface 24 in the direction of rotation of the wheel 18.

A drive system 34 drives the feed mechanism 12, and in particular the wheel 18, and is also coupled to the injection device 14 and the cutter 16. Moreover, the drive system 34 is coupled to the injection device 14 to move the injection device 14 between an extended position (shown in FIGS. 1-3) where the injection device penetrates an incendiary seated in a recess 22 at position P1 (refer FIG. 2), and a retracted position (not shown) where the injection device is spaced from an incendiary.

Similarly, the drive system 34 is coupled to the cutter 16 for moving the cutter 16 between an extended position (shown in FIG. 2) where it cuts an incendiary 212 from the belt 210, and a retracted position where the cutter 16 is spaced from the belt 210.

The drive system 34 is in the form of an intermittent gear arrangement, and more particularly, in this embodiment, a geneva gear composed of a driver 36 and a follower 38. The follower 38 is fixed to the wheel 18.

The driver 36 is in the form of a disc 40 having a pin 42 extending perpendicularly from one side of the disc 40 at an off-centre, location. The disc 40 is also provided with an off-centre lobe 44 on the same surface from which the pin 42 extends. The lobe 44 is provided on one side with a convex surface 46. In this particular embodiment, the disc 40 is driven or rotated continuously by a hand crank 48 which includes a handle 50 fixed to and extending perpendicularly from a rotatable shaft 52. The shaft 52 is disposed within a cylinder 54.

Figure 6:
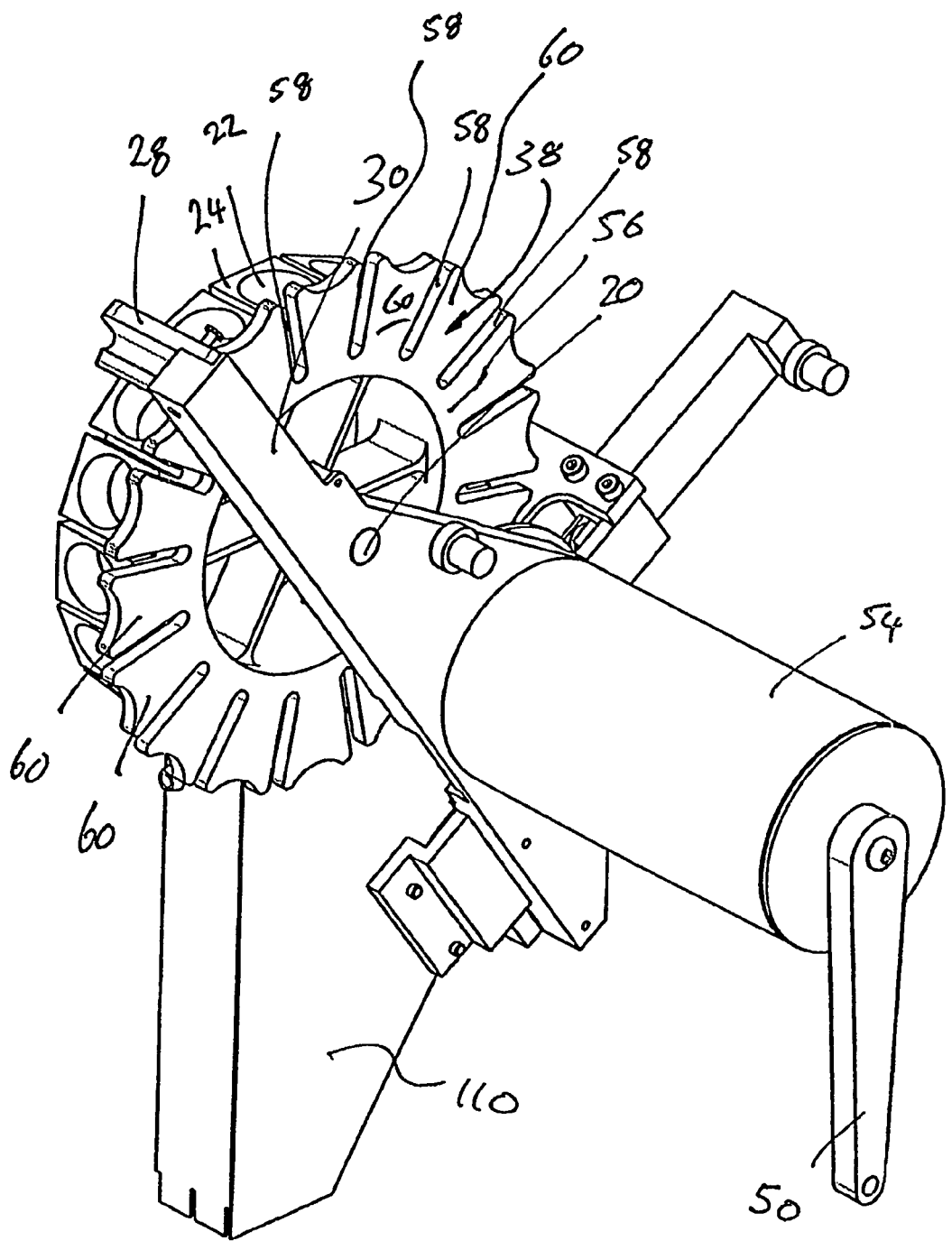
FIG. 6 is a rear perspective view of the apparatus shown in FIG. 1.

The follower 38 is in the form of an annular plate 56 (refer FIG. 6) having a plurality of radially extending slots 58 which-extend from an outer diameter of the plate 56 toward, but stopping short of, an inner diameter of the plate 56. Tabs 60 are formed between adjacent slots 58. The radially outer-most edge of each tab 60 is formed with a concave recess 62. The recesses 62 are formed of a shape complimentary to the convex surface 46 of the lobe 44.

For each revolution of the driver 36 ie disc 40, the follower 38 moves a fraction of a revolution. In short, this motion arises due to the pin 42 engaging a slot 58 for a portion of a revolution of the disc 40 thereby advancing the follower 38 only while the pin 42 resides within a slot 58. During the remainder of the revolution of the disc 40, the convex surface 46 of the lobe 44 is received within the concave recess 62 of a tab 60 effectively locking the follower 38 from further rotation. The operation and mechanics of a geneva gear are well known and will not be discussed any further in this specification.

The injection device 14 includes a needle 64 of a form similar to a hypodermic needle which is in fluid communication with a duct 66. The duct 66 is coupled to a web 68 of a slide 70 which is mounted on a rail 72.

As seen most clearly in FIG. 2, the driver 36 of the drive system 34 is coupled to the slide 70 by a link 74. The link 74 is pivotally coupled at one end 76 to the driver 36 (and more particularly to the lobe 46 of the disc 40) and at an opposite end 78 to the slide 70. It will be appreciated that as the driver 36 rotates it reciprocates the slide 70 along the rail 72.

The cutter 16 is in the form of a blade 80 which is fastened by a screw 82 to a portion of the web 68 so as to extend substantially parallel to the needle 64. The blade 80, needle 64 and slots 26 are relatively configured so that when an incendiary is seated in a recess 22 at the position P1, the needle 64 can penetrate the incendiary and the blade 80 is driven into an adjacent slot 26 cutting the incendiary from the belt 210.

Figure 4:
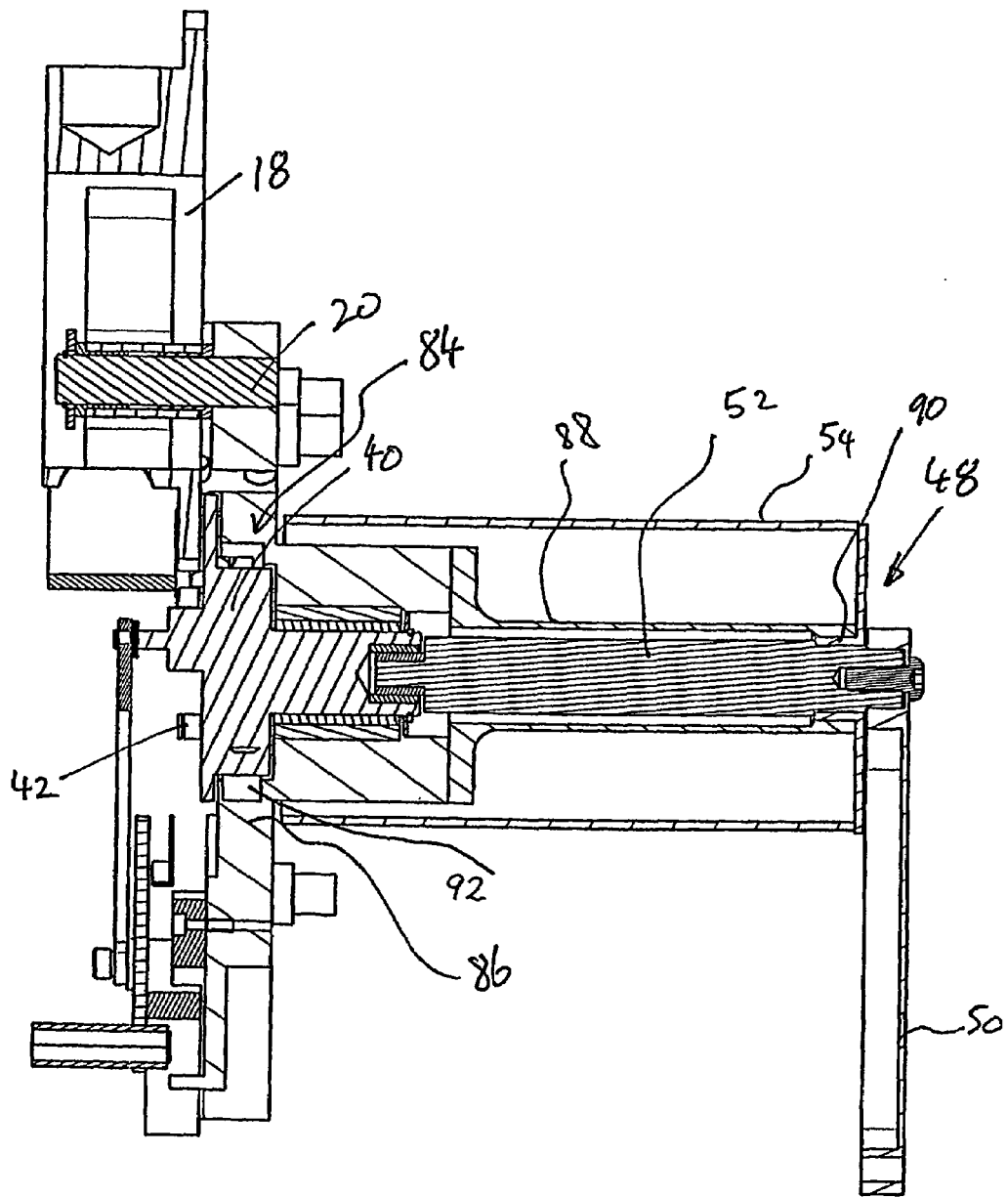
FIG. 4 is a stepped cross-section view of the components shown in FIG. 1.

When the needle 64 is in the extended position, a dose of glycol is pumped through the duct 66 and needle 64 into the incendiary. The glycol is pumped via a peristaltic pump 84 (see FIG. 4) which is driven by the drive system 34. The peristaltic pump 84 includes an outer housing 86 which is fixed against rotation by attachment to a hollow shaft 88 which in turn is fixed to a spigot 90 formed integrally with the cylinder 54. The outer housing 86 together with the disc 40 defines a circular channel 92 in which is disposed a deformable conduit (not shown) of the pump 84. Pump 84 also includes a set of rollers (not shown) driven with the disc 40 to facilitate a pumping action of the glycol. The deformable conduit is in fluid communication with the duct 66.

Referring to FIGS. 2 and 3, a retaining device in the form of a plate 94 is provided near the injection device 14 for retaining an incendiary held within a recess 22 in position P1 while the injection device 14 and cutter 16 reciprocate along the rail 72. The plate 94 prevents an incendiary into which the needle 64 has penetrated from being pulled out of the recess 22 as the needle 64 is being retracted. To this end, the plate 94 is provided with a section 96 which faces an incendiary held within the recess at location P1. The portion 96 of the plate 94 is also provided with an opening 98 through which the needle 64 can extend.

Figure 5:
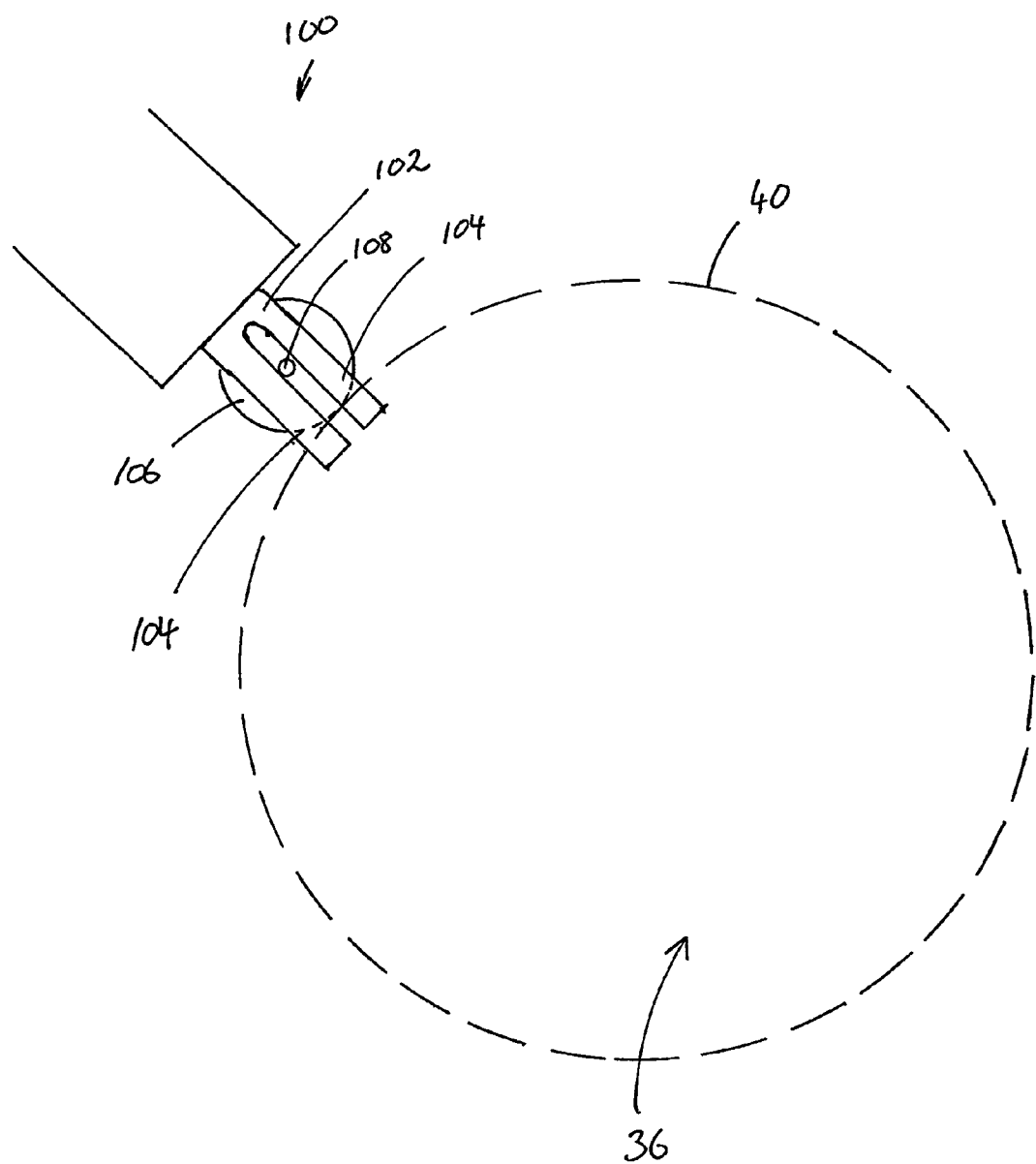
FIG. 5 is a schematic representation of a park system incorporated in the apparatus.

The apparatus 10 also comprises a park system 100, shown in FIG. 5, for placing the apparatus 10 in a park position which is characterised by the injecting device 14 and cutter 16 being in their respective retracted positions and the wheel 18 being rotated or indexed so that an incendiary capsule in a recess 22 at position P1 is moved to the dispensing location D. The park system 100 includes a bifurcated arm 102 where each of the bifurcations is provided with two spaced apart fingers 104. A wheel 106 is held between the bifurcations and is rotatable on an axle 108 which is slidably retained at is opposite ends between the adjacent fingers 104 of each bifurcation. The wheel 106 is biased to apply torque to the disc 40 in a direction causing the wheel 18 to rotate in the anti-clockwise direction. In the absence of torque being imparted to the disc 40 by the hand crank 48, the wheel 106 of the park system 100 drives the disc 40 causing it to rotate to a position where the link 74 forces the slide 70 along the rail 72 away from the wheel 18 moving the injection device and the cutter 16 to their retracted positions and indexing the wheel 18 so that an incendiary that was in a recess 22 at position P1 has now moved to a recess at the dispensing location D.

Figure 7:
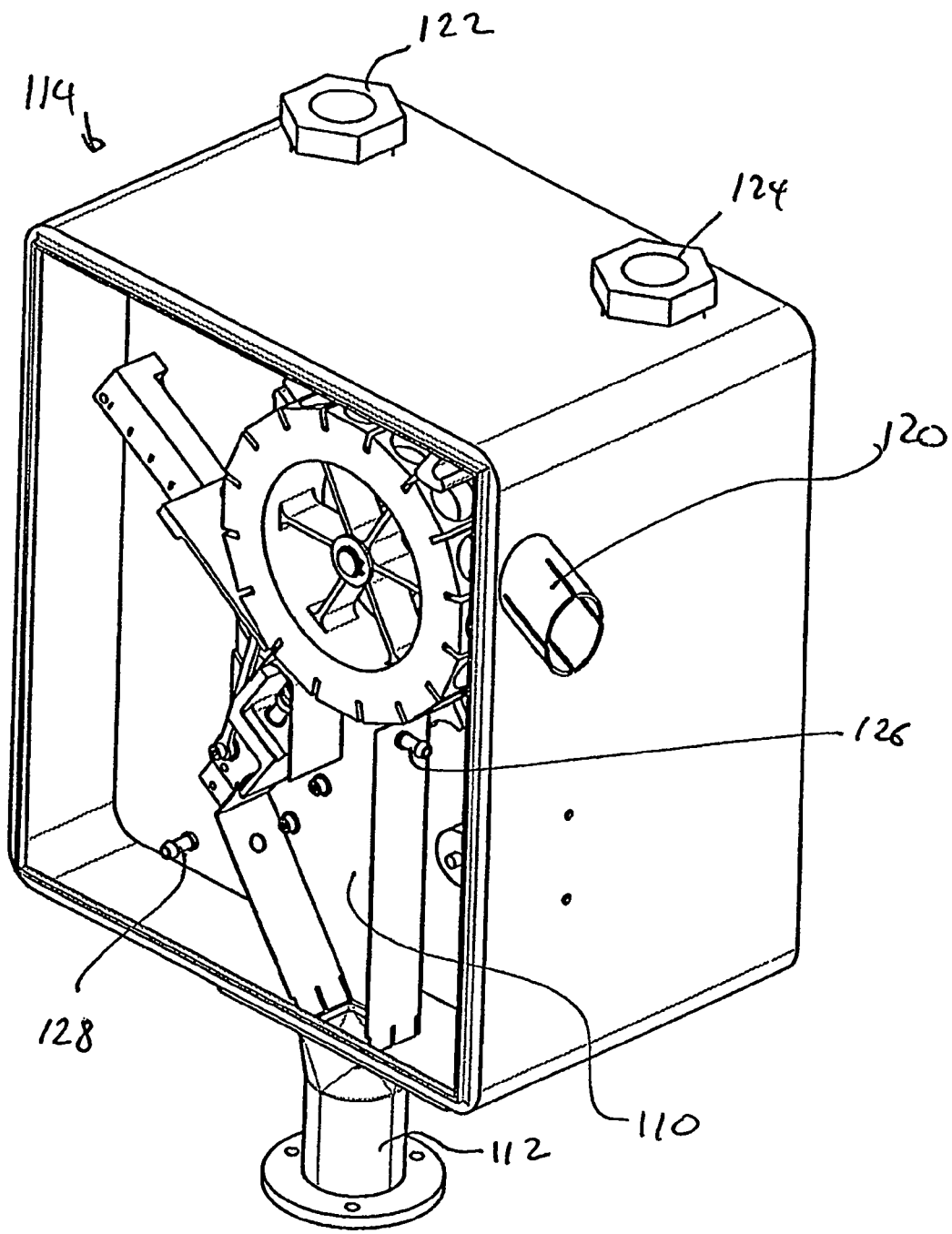
FIG. 7 is a perspective view of the apparatus with a door of its housing removed.
Figure 8:
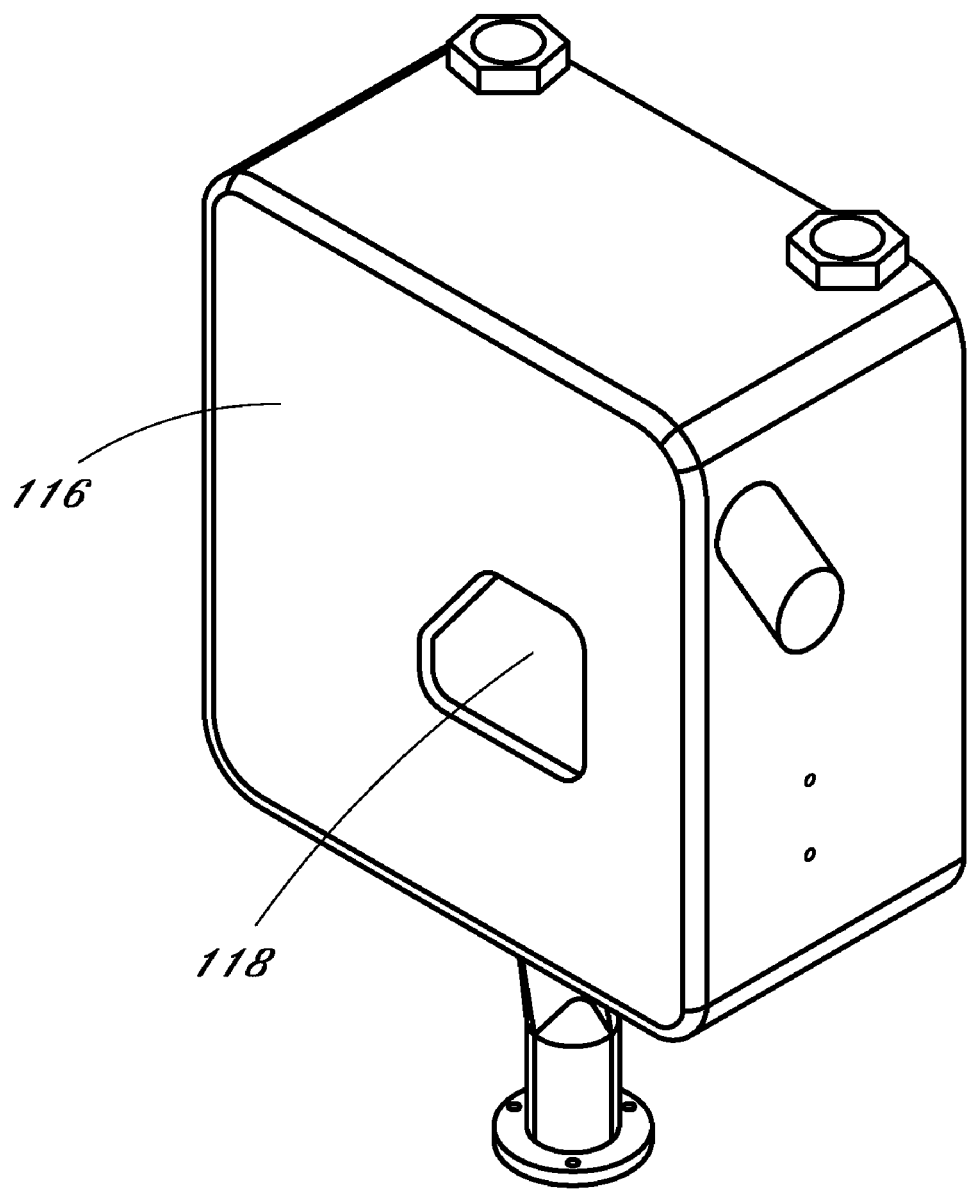
FIG. 8 is a perspective view of the apparatus with its housing closed.

Referring to FIGS. 1, 7 and 8 a chute 110 is formed beneath and about the dispensing location D for directing an incendiary to an outlet 112 formed in a housing 114 which houses the feed mechanism 12, injection device 14 and cutter 16. The housing 114 is in the form of a box having a door 116 which can be selectively opened and closed. The door 116 has a window 118 at a location to allow a user to observe the reciprocation of the injection device 14 and cutter 16, and the release of an incendiary from a recess 22 at the dispensing location D. The housing is provided with an inlet tube 120 through which an incendiary belt 210 can be fed into the housing 114. The housing also includes fluid inlet ports 122 and 124. The fluid inlet port 122 is coupled to a supply of glycol (not shown) which is injected into the incendiaries via the injection device 14. The port 124 is connected to a supply of water or other fluid which can be used as part of an extinguishing system to extinguish an incendiary within the housing 114. The extinguishing system also includes nozzles 126 and 128 which can be coupled by a hose to the supply of water via the port 124. The nozzle 126 sprays water into the chute 110 while the nozzle 128 sprays water into the housing 114 in the vicinity of the injection device 14. The extinguishing system can include an electric pump for delivering water to the nozzles 126 and 128. Advantageously a crank can also be provided to manually operate the pump of the extinguishing system.

With particular reference to FIGS. 9-11 the incendiary belt or line 210 comprises a plurality of incendiaries 212 each containing a volume of a first substance 214, for example potassium permanganate, which, when mixed with a second substance, for example glycol (not shown) reacts exothermically. The exothermic reaction continues to the extent that the substances combust and generate a flame. A frangible coupling in the form of one or more tabs 216 couples or connects the incendiaries 212 together. Most conveniently, the tabs 216 couple the incendiaries 212 side-by-side, and more particularly serially in a line. In this way, the incendiary belt 210 is in the form of a flexible belt having a plurality of incendiaries 212 which are mutually held together until separated by the apparatus 210.

Each incendiary 212 includes a receptacle 218 in the shape of a hemisphere having an opening 220 which opens into a flat surface 222. The opening 220, and flat surface 222 lie in a plane containing the diameter of the hemispherical receptacle 218, with the flat surface 222 extending outwardly from the perimeter of the opening 220.

During manufacture, receptacles 218 are initially formed and then a volume of the material 214 deposited in each. Thereafter, the openings 220 are closed by seals 224 which extend across the flat surface 222. The seals 224 can be in the form of a thin metal foil, a plastics sheet or a paper or cardboard strip which are glued or otherwise attached to the receptacles 218 and/or flat surfaces 222.

The tabs 216 which constitute the frangible couplings can take many different forms. In FIG. 9, each tab 216 is illustrated as a thin web of material extending between the flat surfaces 222 of adjacent incendiaries 212. The web may be formed separately of the incendiaries 212 and individually attached between adjacent incendiaries 212. However this is likely to be an inefficient way of forming the coupling. Other forms of couplings are depicted in FIGS. 12 and 13.

In FIG. 12, the coupling 216 is formed integrally with the flat surfaces 222 of adjacent incendiaries 212, as a section of a reduced thickness for ease of separation and to provide additional flexibility between adjacent incendiaries 212.

In FIG. 13, the frangible couplings 216 is formed as an integral part of the seal 224 which spans a small separation gap 226 between adjacent incendiaries 212. To further facilitate separation of adjacent incendiaries 212 the frangible couplings 216 may be provided with a line of perforations or slits (not shown).

In yet a further alternative frangible couplings 216 can be formed as a strip of frangible material such as metal or plastic or paper which runs along and is attached to the surfaces 222 of adjacent incendiaries 212 overlying the seal 224, to span separation gaps 226 between adjacent incendiaries 212.

In the embodiments depicted in FIGS. 9-13, the flat surface 222 extends outwardly in a plane containing the diameter of the hemispherical receptacles 218. However, in a further embodiment depicted in FIG. 14, the flat surfaces 222 can be limited to the upper surface of the receptacle portion 218 surrounding the opening 220. Accordingly the surface 222 would in effect be in the shape of an annulus. The seal 224 is glued or otherwise attached to the surface 222 as in the previous embodiments. Adjacent incendiaries 212 of the type depicted in FIG. 14 can be coupled together with a frangible coupling means in a similar manner as described above in relation to the incendiary belt 210 depicted in FIGS. 9-13.

Figure 15:
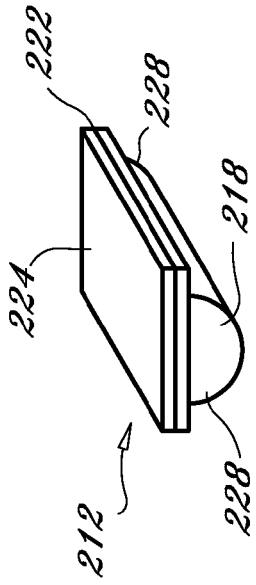
FIG. 15 is a perspective view from the side of a container of another embodiment of the incendiary; and, FIG. 16 is a bottom view of the container depicted in FIG. 12.
Figure 14:
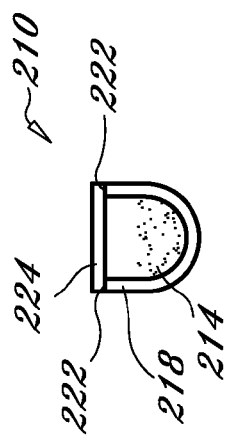
FIG. 14 is a section view of a container of a further embodiment of the incendiary.
Figure 16:
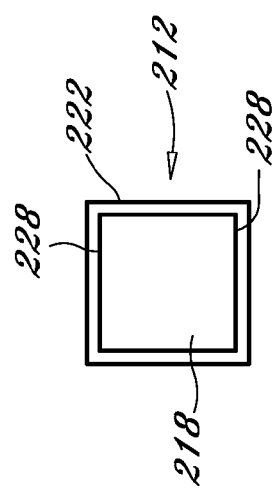

FIGS. 14 and 15 depict a further variation in the configuration of the incendiaries 212. In this embodiment, the receptacle portion 218' is in the shape of a hemicylinder, ie a cylinder cut in a plane containing its central longitudinal axis, and having its opposite ends closed with semicircular walls 228. The receptacle 218' opens onto a flat surface 222 which extends outwardly from the perimeter of the opening. Each incendiary 212 is sealed with a seal 224, and coupled to adjacent containers 212 in a similar manner as described above in relation to the embodiments depicted in FIGS. 9-14.

The operation of the apparatus 10 will now be described.

A box of incendiary capsules 210 is placed adjacent the apparatus 10. With the door 116 of the housing 114 removed, the belt 210 of incendiaries 214 is fed through the inlet tube 120 into the housing 114. The belt is then passed under the guide 28 so that a leading incendiary is seated in a recess 22 in advance of the guide 28. The door 116 is then closed. A supply of glycol and a supply of water are connected to the ports 122 and 124 respectively. The apparatus 10 is located in a light aircraft or a helicopter, in a position where the outlet 112 is in communication with the outside of the aircraft. Once airborne, and over a location where the incendiaries are required to be dropped, an operator turns the handle 50 causing the drive system 36 to sequentially index the wheel 18 in the anti-clockwise direction thereby advancing the incendiary belt 210 toward the discharge position D. Eventually, a leading incendiary 212 will be in a recess 22 which has been advanced to the position P1. During the next rotation of the driver 36, the injection device 14 and cutter 16 slide toward their respective extended positions toward the axle 20 so that the needle 64 penetrates the seal 224 of the leading incendiary and the blade 80 cuts the incendiary 212 from the belt 210. The rotation of the driver 36 operates the peristaltic pump 84 to deliver a dose of glycol through the needle 64 to the material held within the incendiary 212. There is a delay of about 20 to 30 seconds before the exothermic reaction between the glycol and the substance within the incendiary 212 reaches a stage where a flame is produced. Well before this time, the continued rotation of the driver 36 has indexed the wheel 18 to retract the injection device 14 and cutter 16 to a position where they are spaced from the incendiary belt 210. The previously injected and cut incendiary 212 is held within the recess 22 in position P1 while this occurs by the plate 94. As the wheel 18 is again indexed, this incendiary is moved or advanced to the dispensing position D where it falls freely from its recess 20 and is guided down the chute 110 to the outlet 112 where it can then fall to the ground.

With the incendiary belt 210 formed and dimensioned so that adjacent containers 212 seat in adjacent recesses 22, upon every indexing of the wheel 18, an incendiary which has been initiated or activated by the injection of glycol will be dispensed through the chute 110 and outlet 112.

In the event of the operator letting go of the handle 50 prior to the wheel 18 being indexed to a position where the injection device 14 and cutter 16 are in their respective retracted positions, the park system 100 will apply torque to the driver 36 to rotate the wheel 18 and force the slide 70 along the rail 72 away from the axle 18 thereby placing the injection 14 and cutter 16 in their respective retracted positions. This also indexes the wheel 18 one position so any incendiary container which was injected with glycol at position P1 will be advanced to the dispensing position D and dispensed from the apparatus 10.

Now that an embodiment of the present invention has been described in detail it will be apparent to those skilled in the relevant arts that numerous modifications and variations may be made without departing from the basic inventive concepts. For example, the drive system 34 is described and illustrated as being in the form of a geneva gear. However other intermitted gear arrangements may be incorporated to produce the same effect. Also, torque can be imparted to the drive system 34 by an electric motor rather than the hand crank mechanism 48. Alternately, a dual electric and manual system can be provided where torque is imparted to the drive system 34 primarily through an electric motor with a hand crank being provided for back-up in the event of failure of the motor.

In yet a further variation, the motion of the wheel 18 and injection device 14 can be controlled by a processor or computer. For example, individual electric motors can be provided for rotating wheel 18 and reciprocating the injection device 14 with the processor or computer controlling the motors to correctly sequence and time the motion of the wheel 18 and injection device 14.

In relation to the incendiaries 212 and belt 210, the shape of the receptacles 212 is essentially limitless. It can, for example, take the form of a cube, triangular prism or indeed even a sphere. Also, fins or other aerodynamic aids may be provided, for example by moulding integrally with the incendiaries 212 to improve their aerodynamics. It will also be evident that many forms of coupling 216 can be used provided the coupling can be broken, either by hand or machine, when the incendiary belt 210 is in use to allow separation of previously coupled incendiaries 212. For example with particular reference to FIG. 12 the coupling 216 could be a simple extension of a part of the surfaces 222 of the adjacent incendiaries 212 without the need for an intermediate zone of reduced thickness. In this form the coupling 216 can be broken by a mechanical cutter (e.g. the blade 80). Alternately or in addition a score line can be formed along the surface 222 of adjacent incendiaries 212 or a notch cut in an edge at an intermediate point between surfaces 222 of adjacent incendiaries 212 to assist in the manual or mechanical separation of the receptacles 218.

All such modifications and variations together with others that would be obvious to a person of ordinary skill in the art are deemed to be within the scope of the present invention the nature of which is to be determined from the above description and the appended claims.

The invention claimed is:

1. An apparatus for initiating and dispensing an incendiary from a line of series connected incendiaries, said apparatus comprising:
a feed mechanism for advancing a line of series connected incendiaries to a dispensing location; an injection device for injecting a substance into an incendiary as said incendiary is advanced to said dispensing location, said injected substance reacting exothermically with another substance in said incendiary; and, a cutter for cutting said incendiary from said line of series connected incendiaries; wherein said feed mechanism advances said incendiary, after injection with said substance and cutting from said line, to said dispensing location where said incendiary is dispensed from said apparatus.

2. The apparatus according to claim 1 wherein said feed mechanism comprises at least one recess, each recess shaped to seat a respective incendiary.

3. The apparatus according to claim 1 wherein said feed mechanism comprises a plurality of recesses, each recess shaped to seat a respective incendiary, and wherein adjacent recesses are spaced by a distance substantially equal to the distance between adjacent series connected incendiaries.

4. The apparatus according to claim 2 further comprising a drive system for driving said feed mechanism.

5. The apparatus according to claim 4 wherein said drive system is coupled to said injection device for moving said injection device between an extended position where said injection device penetrates said incendiary, and a retracted position where said injection device is spaced from said incendiary.

6. The apparatus according to claim 5 wherein said drive system is coupled to said cutter for moving said cutter between an extended position where said cutter cuts an incendiary from said line and a retracted position where said cutter is spaced from said line.

7. The apparatus according to claim 6 wherein said injection device and cutter are mounted on a slide and said slide is reciprocated by said drive system between said extended position and said retracted position.

8. The apparatus according to claim 7 wherein said slide is supported on a rail and said drive systems reciprocates said slide along said rail.

9. The apparatus according to claim 6 wherein a slot is provided between respective adjacent recesses in said feed mechanism over which said line extends when being advanced to said dispensing position, and said cutter is juxtaposed to extend into said slot to cut said line when moved to its extended position.

10. The apparatus according to claim 6 further comprising a retaining member for retaining an incendiary in a respective recess while said injection device and said cutter are moved from their respective extended positions to their respective retracted positions.

11. The apparatus according to claim 10 wherein said injection device extends through said retaining member when said injection device is moved to said extended position.

12. The apparatus according to claim 11 wherein said retaining member is a plate having a first portion which faces an incendiary when at a location where said injection device penetrates said incendiary.

13. The apparatus according to claim 1 further comprising a pump for pumping a dose of said substance to an incendiary via said injection device.

14. The apparatus according to claim 13 wherein said pump is driven by said drive system.

15. The apparatus according to claim 14 wherein said pump is a peristaltic pump.

16. The apparatus according to claim 6 wherein said drive system comprises an intermittent gear arrangement including a driver arranged for continuous rotation and a follower supporting said feed mechanism wherein for a first portion of a revolution of said driver, said driver engages said follower to rotate said follower by a fraction of a revolution, and for a remaining portion of the revolution of said driver, said follower is locked against rotation.

17. The apparatus according to claim 16 wherein said driver is coupled to said slide for reciprocating said slide along said rail.

18. The apparatus according to claim 17 further comprising a link pivotally coupled at one end to said driver and pivotally coupled at an opposite end to said slide.

19. The apparatus according to claim 6 further comprising a park system for biasing said injection device to said retracted position.

20. The apparatus according to claim 19 wherein said park system biases said driver to rotate to a position where said driver drives said slide to a location commensurate with said injection device being in said retracted position.

21. The apparatus according to claim 1 further comprising a housing in which said feed mechanism, cutter and injection device are housed, said housing having an inlet through which said line of series connected incendiaries can enter said housing and a chute through which incendiaries are dispensed.

22. The apparatus according to claim 1 further comprising an extinguishing system for extinguishing an incendiary into which said substance is injected.

23. The apparatus according to claim 16 wherein said intermittent gear arrangement is a geneva gear.

24. A method of initiating and dispensing an incendiary from a line of series connected incendiaries, the method comprising:
feeding a line of series connected incendiaries to a dispensing location;
injecting a substance into an incendiary as the incendiaries are fed to said dispensing location, said injected substance reacting exothermically with another substance in said incendiary;
cutting the incendiary injected with the substance from said line of series connected incendiaries; and,
when the incendiary injected with the said substance reaches the dispensing location, dispensing the incendiary from said apparatus.

25. A method for initiating and dispensing an incendiary from a line of series connected incendiaries, said method comprising:
providing a feed mechanism for advancing a line of series connected incendiaries to a dispensing location;
providing an injection device for injecting a substance into an incendiary as said incendiary is advanced to said dispensing location, said injected substance reacting exothermically with another substance in said incendiary; and,
providing a cutter for cutting said incendiary from said line of series connected incendiaries;
wherein said feed mechanism advances said incendiary, after injection with said substance and cutting from said line, to said dispensing location where said incendiary is dispensed from said apparatus.

* * * * *